United States Patent
Chisu et al.

(10) Patent No.: US 11,909,687 B2
(45) Date of Patent: Feb. 20, 2024

(54) METHODS, SYSTEMS, AND ELECTRONIC DEVICES FOR INITIATING A COMMUNICATION CHANNEL FOR A FIRST COMMUNICATION DEVICE WITH A SECOND COMMUNICATION DEVICE

(71) Applicant: Motorola Mobility LLC, Chicago, IL (US)

(72) Inventors: Daniel C Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 280 days.

(21) Appl. No.: 17/503,280

(22) Filed: Oct. 16, 2021

(65) Prior Publication Data

US 2023/0118841 A1    Apr. 20, 2023

(51) Int. Cl.
*H04L 5/00* (2006.01)
*H04W 76/15* (2018.01)
*H04B 7/0426* (2017.01)
*H04W 64/00* (2009.01)

(52) U.S. Cl.
CPC .......... *H04L 5/0053* (2013.01); *H04B 7/043* (2013.01); *H04L 5/0048* (2013.01); *H04W 64/003* (2013.01); *H04W 76/15* (2018.02)

(58) Field of Classification Search
CPC .... H04L 5/0053; H04L 5/0048; H04W 76/15; H04W 64/003; H04B 7/043
See application file for complete search history.

(56) References Cited

U.S. PATENT DOCUMENTS

2017/0078846 A1* 3/2017 Sheynblat ............. H04W 4/023
2019/0320358 A1* 10/2019 Knapp ............. H04W 52/0241

FOREIGN PATENT DOCUMENTS

| EP | 1699188 | 9/2006 |
| EP | 3790325 | 6/2022 |
| GB | 2491869 | 10/2013 |

OTHER PUBLICATIONS

Ahmad, Moonas, "GB Search Report", GB2214500.7; dated Mar. 28, 2023.

(Continued)

*Primary Examiner* — Justin Y Lee
(74) *Attorney, Agent, or Firm* — Philip H. Burrus, IV

(57) ABSTRACT

A method in an electronic device includes transmitting, with a first communication device using a first communication network, a parameter of the electronic device to a base station of a second communication network. The method includes receiving, with the first communication device using the first communication network, overhead information facilitating electronic communication with the base station using the second communication network. The electronic device can then establish, with a second communication device using the second communication network, a communication channel with the base station. The electronic device can then communicate, with the second communication device using the second communication network, with the base station via the communication channel. The first communication network and the second communication network are different.

20 Claims, 11 Drawing Sheets

(56) References Cited

OTHER PUBLICATIONS

"Ultra-Wideband (UWB) Here's everything you need to know", Bleesk.com; Unknown publication date but prior to filing of present application; Viewed online Feb. 3, 2022 at https://bleesk.com/uwb.html.

"What is 5G NR Initial Access Procedure", Moniem-Tech; Published Oct. 16, 2019; https://moniem-tech.com/questions/what-is-5g-nr-initial-access-procedure/.

"What is UWB", DecaWave Technology; https://www.decawave.com/technology1/; Unknown Publication Date but prior to filing of present application.

Dahad, Nitin, "Volkswagen and NXP Show First Car Using UWB to Combat Reply Theft", EE|Times; Published Aug. 26, 2019; https://www.eetimes.com/volkswagen-and-nxp-show-first-car-using-uwb-to-combat-relay-theft/.

Kunhoth, et al., "Indoor Positioning and Wayfinding Systems: A Survey", HCIS Journal—Springer Open; Published May 2, 2020; https://hcis-journal.springeropen.com/articles/10.1186/s13673-020-00222-0.

Pirc, Peter, "4 Mythis about UWB, Debunked", Electronic Specifier; Published Jun. 28, 2021; https://www.electronicspecifier.com/industries/wireless/4-myths-about-uwb-debunked.

\* cited by examiner

METHODS, SYSTEMS, AND ELECTRONIC DEVICES FOR INITIATING A COMMUNICATION CHANNEL FOR A FIRST COMMUNICATION DEVICE WITH A SECOND COMMUNICATION DEVICE

BACKGROUND

Technical Field

This disclosure relates generally to electronic devices, and more particularly to electronic devices configured to communicate wirelessly with other electronic devices.

Background Art

The technology associated with portable electronic devices such as smartphones and tablet computers is continually improving. New developments in wireless communication technology offer more reliable networks, faster communication speeds, and more bandwidth.

While developments such as 5G and other communication networks offer incredibly fast data transfer speeds, their usage is not without tradeoffs. For instance, smartphones and other portable electronic communication devices frequently consume large amounts of power during signal acquisition and tracking processes that occur when establishing a communication channel with a base station. When the network employs technologies such a millimeter wave communication, which uses a narrower beam with more precise positioning, the power consumption increases even more as additional resources are required to lock to a reference signal. It would be advantageous to have improved methods, devices, and systems that established communication channels with modern networks more efficiently.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
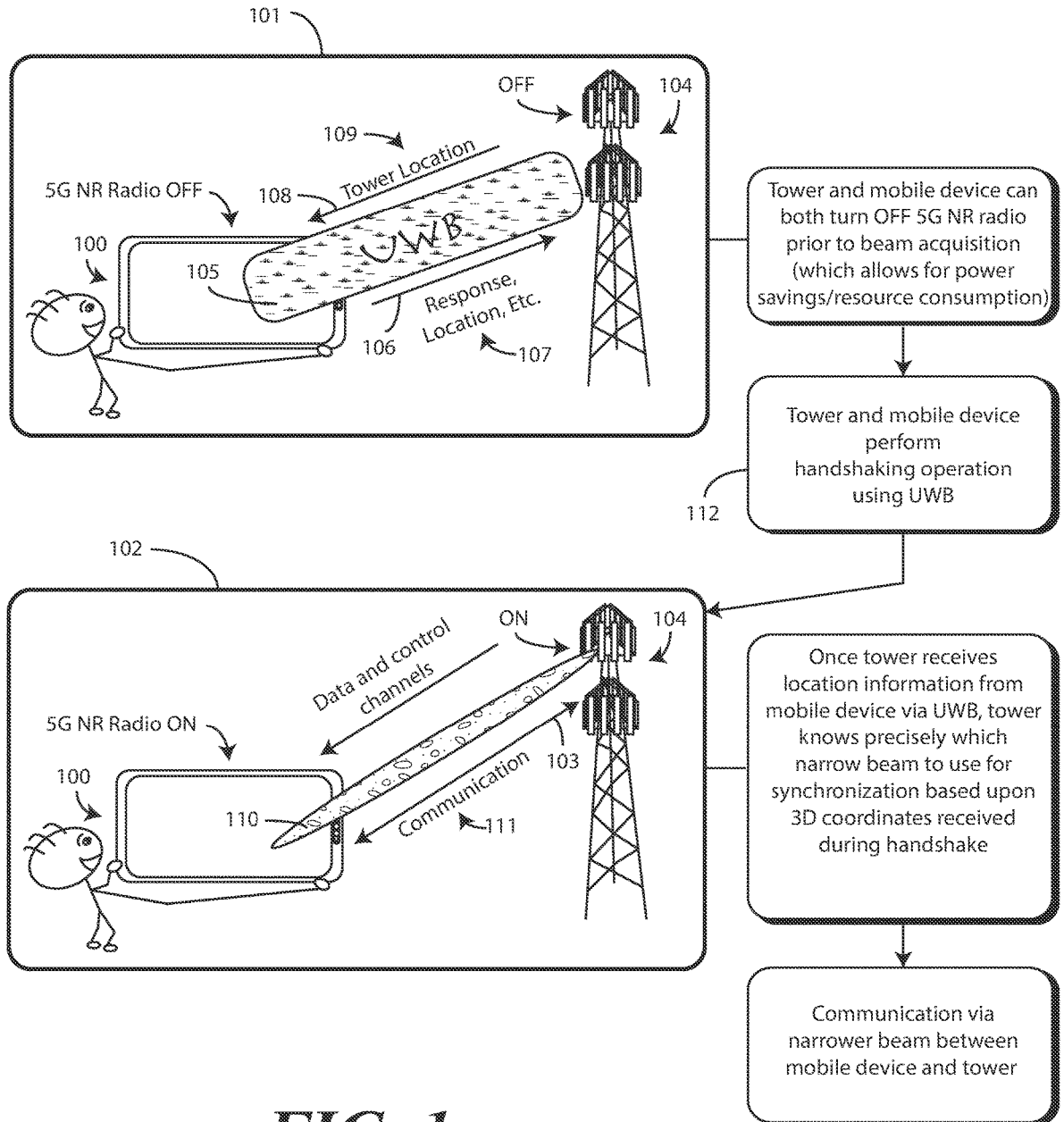
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to obtaining information facilitating communication between an electronic device and a base station of a wide area network using a first communication device of the electronic device and, thereafter, establishing communication with the base station on a communication channel of a second communication network from the information received from the first communication device using a second communication device of the electronic device that is different from the first communication device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or wireless electronic communication technology, improve the functioning of the electronic device itself by making the establishment of a wireless communication channel with a base station more efficient, thereby overcoming problems specifically arising in the realm of the technology associated with wireless electronic communication with terrestrial base stations.

It will be appreciated that embodiments of the disclosure described herein may be comprised of one or more conventional processors and unique stored program instructions that control the one or more processors to implement, in conjunction with certain non-processor circuits, some, most, or all of the functions of using a first communication device communicating on a first communication network to communicate a location of an electronic device and to identify a plurality of communication channels operating in a second communication network that is different from the first communication network, and then establishing communication on the second communication network using the second communication device as described herein. The non-processor circuits may include, but are not limited to, a radio receiver, a radio transmitter, signal drivers, clock circuits, power source circuits, and user input devices.

As such, these functions may be interpreted as steps of a method to perform the initiation of establishment of a communication channel with a second communication device on a second communication network by using a first communication device communicating on an first communication network, and then finalizing the establishment of the communication channel using the second communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically.

Also, reference designators shown herein in parenthesis indicate components shown in a figure other than the one in discussion. For example, talking about a device (10) while discussing figure A would refer to an element, 10, shown in figure other than figure A. Additionally, some methods shown in figures include steps presented with textual descriptions of what is occurring in the pictorial frames of the method. Where these descriptions are sufficiently explained in the descriptions below with reference to the pictorial frames, a repeated description of the textual frames does not occur. Instead, the textual frames provide both a reinforcement of the description in the specification and compliance with 37 CFR 1.83(a).

As noted above, portable electronic devices capable of wireless communication, such as smartphones and tablet computers, require relatively large amounts of power for the signal acquisition and tracking functions associated with establishment of wireless communication channels with base stations. With developing communication networks, such as 5G networks employing millimeter wave communication channels, this power consumption problem is exacerbated due to the fact that the millimeter wave communication beams become narrower. Accordingly, precise positioning a locating processes are required so that the communication device of an electronic device can lock on to a reference beam signal.

In a simplification of the communication channel establishment process, a base station has to locate an electronic device. Using a 5G communication network as an illustrative example, the base station must continuously perform beam sweeps, with the 5G radio of the electronic device having to then detect the strongest beam. Once this beam is detected, one or more processors of the electronic device cause the communication device of the electronic device to respond to the strongest beam with a physical random access channel (PRACH) transmission to the base station. Once the best beam is selected, the communication device of the electronic device can establish a communication channel.

Not only does this require large amounts of power in the electronic device, it also requires large amounts of power to be consumed in the base station. Moreover, since a sweep, detect, and respond exchange must be performed before a communication channel can even be established with the base station, this process can take longer times to complete.

Figure 11:
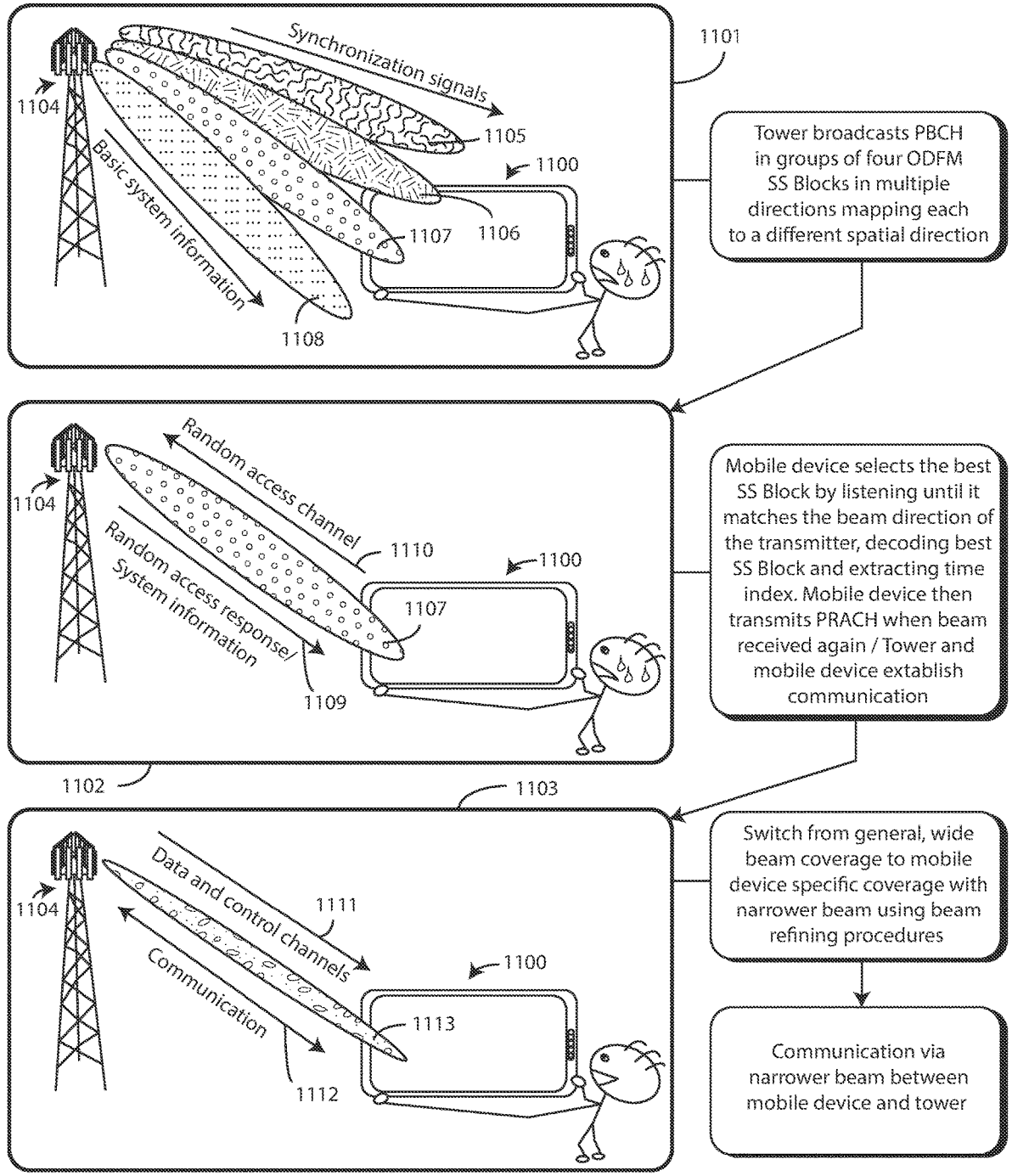
FIG. 11 illustrates a prior art method.

Turning now to FIG. 11, illustrated therein is such a prior art process. Beginning at step 1101, a base station 1104 performs a beam sweeping operation. During the beam sweeping operation, the base station transmits the physical broadcast channel (PBCH) in groups of four orthogonal frequency-division multiplexing (ODFM) symbols 1105, 1106, 1107, 1108 called synchronization signal blocks (SS blocks). These four ODFM symbols 1105, 1106, 1107, 1108 are swept sequentially in multiple directions as shown at step 1101. Each of the ODFM symbols 1105, 1106, 1107, 1108 is mapped to a different spatial direction at step 1101.

At step 1102, an electronic device 1100 selects the strongest detected ODFM symbol 1107 as the best SS block to use. The electronic device 1100 employs a communication device that listens to the various signals of each ODFM symbol 1105, 1106, 1107, 1108 until it matches the beam direction 1109 of the transmitter situated at the base station 1104. This allows the electronic device 1100 to decode the best SS block and extract its time index.

Since the beam sweeping process repeats, one or more processors of the electronic device 1100 are programmed to not only expect that beam direction 1109 to be used again, but to know when the beam direction 1109 will be used again from the time index. Accordingly, the electronic device 1100 causes its communication device to transmit back on the PRACH 1110 at the appropriate time. This allows the base station 1104 to determine from which direction and at what time the electronic device 1100 will transmit its location information.

As shown at step 1103, once the electronic device 1100 and the base station 1104 establish communication on the best beam, the base station then sends system information 1111 needed by the electronic device 1100 to establish a communication channel 1112 with the base station 1104. At this point, the system switches from general, wider beam coverage to coverage with a narrow beam 1113 using beam refining procedures.

While this prior art method works adequately in practice, it is not without problems. One problem is that the same initial acquisition procedure is executed regardless of how close—or how far—the electronic device 1100 is from the base station 1104. Essentially, it takes just as long for the electronic device 1100 to establish the communication channel 1112 with the base station 1104 when the electronic device 1100 is close to the base station 1104 and receiving strong signals as it does when the electronic device 1100 is farther away from the base station 1104 and receiving less than optimal signals. What's more, this long time may have a duration that is no shorter when the electronic device 1100 is close to the base station 1104 and receiving the strong signals as when the electronic device 1100 is farther away from the base station 1104 and receiving the less than optimal signals.

Next, if for some reason the electronic device 1100 fails to select the best beam, or if tracking a received beam with the communication device of the electronic device 1100 is functioning less than optimally, the electronic device 1100 may end up selecting a lesser preferred beam, which may result in less than optimal wireless communication with the base station 1104. When this occurs, a variety of problems may result, including unwanted signal fading that can cause even more delays and latency when reflected multipath signals are combined at the receiver.

Yet another problem is that the electronic device must keep its communication device, such as a 5G radio when the network is a 5G network, continually active when scanning for service. This can occur even when there are no 5G base stations within a range detectable by the electronic device. This "radio always ON" mode can cause power consumption to jump even higher, as the radio consumes larger amounts of current.

While these problems occur in 5G networks, it is important to note that these problems are common to any terrestrial cellular communication technology relying upon acquisition procedures. Thus, these problems can afflict other networks as well, including 2G networks, 3G networks, 4G networks, 5GNR networks, and so forth.

Embodiments of the disclosure provide a solution to these problems by utilizing two different communication devices operating on two different communication networks to establish a communication channel with a base station. In one or more embodiments, an electronic device uses a first communication device operating on a first communication network to transmit a parameter of the electronic device to a base station of a wide area communication network The first communication device then receives overhead information facilitating electronic communication with the base station operating a second communication network.

In one or more embodiments, the electronic device then uses a second communication device (different from the first communication device) operating in the second communication network (different from the first communication network) to establish a communication channel with the base station. The electronic device can then communicate with the base station on the second communication network.

Illustrating by example, in one or more embodiments the first communication device, is an ultra-wideband communication component, while the second communication device is a cellular communication component. The ultra-wideband communication component can include a transmitter and receiver or transceiver operable to communicate in an ultra-wideband communication network, while the cellular communication component can include a radio operable to communicate with one or more base stations of a terrestrial cellular network, examples of which include 5G networks, 2G networks, 3G networks, 4G networks, and so forth.

In one or more embodiments, the electronic device uses the ultra-wideband component to obtain information from a base station facilitating communication on the cellular network. Thereafter, the electronic device can establish communication on the cellular network using a cellular communication device using the information obtained using the ultra-wideband component when communicating on the ultra-wideband network.

In one or more embodiments, the base station is equipped with an ultra-wideband transceiver capable of detecting ultra-wideband signals from an electronic device equipped with its own ultra-wideband transceiver. In one or more embodiments, both the base station and the electronic device turn OFF their cellular communication devices prior to beam acquisition. Advantageously, this leaves the cellular communication devices in a low-power or sleep mode during this time, thereby conserving power.

In one or more embodiments, instead of continuously broadcasting beam sweeps as described above with reference to FIG. 11, the base station and the electronic device use the much lower power ultra-wideband network for initial communication. For instance, the base station can use the lower power ultra-wideband network to broadcast its location to the electronic device. In addition to location, other parameters that may be necessary for communication on the second communication network can be transmitted too, one example of which is a device identifier or identification number. The electronic device simply receives this information using its ultra-wideband transceiver. The electronic device can then respond using the ultra-wideband network as well.

In one or more embodiments, once the base station has determined the location of the electronic device via the ultra-wideband network, both the base station and the electronic device will be able to select precisely which ODFM symbol should be used for synchronization. In one or more embodiments, this results from the fact that the base station and electronic device exchange three-dimensional location coordinates across the ultra-wideband network.

In one or more embodiments, the information exchanged in a handshaking process across the ultra-wideband network includes a secure transfer of three-dimensional positioning information so that the electronic device can acquire a particular ODFM symbol. In one or more embodiments, the base station additionally transfers the master information block (MIB) and any essential system information blocks (SIBs) on the first communication network.

In one or more embodiments, the electronic device can advantageously expedite the acquisition procedure upon turning ON its cellular radio due to the fact that it can directly tune to the optimal ODFM symbol from the information received from the base station on the ultra-wideband network. This means that the electronic device need not waste time, power, and resources, reading and analyzing signal sweeps prior to establishing the communication channel with the base station. Additionally, both the base station and electronic device can wait to turn ON their cellular radios after preliminary information is exchanged using the ultra-wideband network. Each is able to tune their cellular radios quickly to "fast sync" to the best beam based upon location coordinates obtained using ultra-wideband communications.

Advantageously, embodiments of the disclosure offload portions of the cellular communication channel establishment procedure to the ultra-wideband network. Not only does this save power by allowing the electronic device and base station to turn OFF their cellular radios while this occurs, it also provides other advantages as well.

Ultra-wideband networks are highly secure, highly accurate when used for positioning, and consume very low power. Illustrating by example, positioning using ultra-wideband can be accurate within a centimeter, while cellular triangulation may not be accurate within tens of meters. Additionally, ultra-wideband communications can extend up to 250 meters without compromised reliability. Power drain in ultra-wideband transceivers is orders of magnitude less than with cellular radios as well. Latency is reduced, security is increased, and bandwidths are high. Moreover, ultra-wideband networks are widely scalable, thereby allowing a base station to communicate with large numbers of electronic devices using its ultra-wideband network. Effectively, embodiments of the disclosure provide the base station with an optimized communication channel initiation communication engine that allows faster, more efficient, and more accurate communication channels to be established using its conventional network, e.g., a cellular network.

Embodiments of the disclosure offer so many advantages over the prior art system described above with reference to FIG. 11. To wit, in addition to the power savings described above, the accuracy of the selected beam is improved due to the fact that positioning is incredibly accurate using ultra-wideband communication. What's more, if for any reason a suitable handshake cannot be performed using the ultra-wideband network, a system configured in accordance with embodiments of the disclosure can simply fall back on the prior art acquisition method described above with reference to FIG. 11 until the system is rectified. Still further, while cellular radios can be turned OFF for increased power savings, in other embodiments the ultra-wideband network may operate in parallel with the cellular network to offer enhanced precision for beam signal selections. In such configurations, the three-dimensional orientation beam parameters can be obtained by the base station can be aggregated by using the ultra-wideband network when in range, thereby allowing the base station to offer improved signal coverage for the electronic device. Other advantages will be described below. Still others will be obvious to those of ordinary skill in the art having the benefit of this disclosure.

It should be noted that while ultra-wideband is used as one explanatory communication network with which handshaking processes can be used for illustration purposes, embodiments of the disclosure are not so limited. Embodiments described below can be extended to other communication networks and protocols as well that offer benefits similar to ultra-wideband with as much bandwidth. Additionally, combinations of technological platforms can be used as well. Illustrating by example, instead of using ultra-wideband, other embodiments of the disclosure could use, for example, a Wi-Fi network for communication with a global positioning system (GPS) or other location detector in the electronic device being used for location and orientation. Similarly, side link channels in 5GNR networks can be used instead of ultra-wideband. Other options and alternatives will be obvious to those of ordinary skill in the art having the benefit of this disclosure.

It should also be noted that while embodiments of the disclosure are particularly well suited for 5G networks using millimeter wave communications, they can equally be applied to other cellular networks that do not support millimeter wave beamforming, or that have wide beams or omnidirectional radiation patterns. Examples of such networks include 2G networks, 3G networks, 4G networks, and even 5G sub-6 MHz networks. In such embodiments, system determination and selection may be performed entirely offline using ultra-wideband networks, with cellular radios being turned on only after the strongest signal is selected. Upon actuation, the cellular radio will acquire optimal beam selection directly from the coordinates obtained during the handshaking process occurring on the ultra-wideband network. This can yield a significant benefit to even existing discontinuous reception (DRX) procedures intended for current drain savings after a system is selected.

Turning now to FIG. 1, illustrated therein is one explanatory method configured in accordance with one or more embodiments of the disclosure. Beginning at step 101, an electronic device 100 is initiating an acquisition procedure to establish a communication channel 103 with a base station 104. It should be noted that initially the electronic device 100 may need to perform a signal sweep using the first communication network 105 to find the location of the base station 104. This can occur, for example, when the electronic device 100 has not previously been in communication with the base station 104, or when the electronic device 100 is unaware of the base station's location. In one or more embodiments, the electronic device 100 perform such a sweep using the first communication network 105 before performing any of the other handshaking operations described before or illustrated in FIG. 1. The electronic device 100 may also perform such a sweep when the person is not facing the base station 104. Accordingly, in one or more embodiments the electronic device 100 will perform a limited sweep using the first communication network 105 as an initial procedure. Such a sweep can even be beneficial due to the fact that it is a low-power, high location accuracy procedure, as noted above.

In one or more embodiments, step 101 comprises one or more processors of the electronic device 100 causing a first communication device communicating on a first communication network 105 to transmit 106 a parameter 107 of the electronic device 100 to the base station 104, which is one of many base stations of a second communication network that is different from the first communication network 105. In one or more embodiments, the parameter 107 transmitted to the base station 104 on the first communication network 105 comprises a location of the electronic device 100.

In one or more embodiments, the first communication network 105 comprises a local area network. As one explanatory example used for illustrative purposes in this disclosure, the first communication network 105 comprises an ultra-wideband network. As noted above, a ultra-wideband network is one example of the first communication network 105. Other types of networks having similar operating profiles and bandwidth can be substituted for the ultra-wideband network of FIG. 1.

In one or more embodiments, the second communication network comprises a wide area network. For instance, the wide area network associated with the base station 104 is a cellular network in one or more embodiments, examples of which include 2G, 3G, 4G, 5G, and 5GNR networks.

As shown at step 101, the first communication device of the electronic device 100 then receives 108, on the first communication network 105, overhead information 109 facilitating electronic communication with the base station 104 using a second communication network that is different from the first communication network 105. Illustrating by example, if the first communication network 105 is a ultra-wideband network, the second communication network may be a 5G millimeter wave cellular network, and so forth.

The overhead information 109 can vary. In one or more embodiments, the overhead information 109 includes a location of the base station 104. The overhead information 109 can also include information identifying the PBCHs available from the base station 104, identification of the ODFM symbols or SS blocks, and so forth. Timing and location information relating to the ODFM symbols or SS blocks can be provided as well. Mapping information can also be included in the overhead information 109. Other elements suitable for inclusion with the overhead information 109 will be obvious to those of ordinary skill in the art having the benefit of this disclosure.

In one or more embodiments, upon receiving the overhead information 109 from the base station 104 on the first communication network 105, the one or more processors of the electronic device 100 select a particular communication channel from a plurality of communication channels operating in the second communication network. For instance, when location information is transmitted from the electronic device 100 on the first communication network 105 as a parameter 107 to the base station 104, and when location information is also received by the electronic device 100 on the first communication network 105 from the base station 104, each of the base station 104 and electronic device 100 knows a precise location of the other. Accordingly, from the overhead information 109 one or more processors of the electronic device 100 can select the best SS block offered by the base station 104 to use as a communication channel. In one or more embodiments a parameter 107 transmitted on the first communication network 105 to the base station 104, which may be transferred after receiving the overhead information 109 from the base station 104 on the first communication network 105, includes an identification of the selected SS block that the electronic device 100 will use as the communication channel on the second communication network.

In one or more embodiments, transmission of the parameter 107 from the electronic device 100 to the base station 104, using the first communication device operating on the first communication network 105, occurs while a second communication device operating on the second communication network is OFF or in a low-power or sleep mode. Similarly, receipt of the parameter 107 by the base station 104 using a communication device operating on the first communication network 105 can occur while a communication device operating on the second communication network is OFF or in a low-power or sleep mode as shown at step 101. As described above, this results in power savings in one or both of the electronic device 100 and the base station 104. Thus, in one or more embodiments the transmission of the parameter 107 and the receipt of the overhead information 109, both occurring on the first communication network 105, occurs while the second communication device of the electronic device 100 that is operable on the second communication network is one of OFF, in a low-power mode, or in a sleep mode.

At step 102, and when the second communication device of the electronic device 100 that is operable on the second communication network was one of OFF, in a low-power mode, or in a sleep mode while step 101 is occurring, the one or more processors of the electronic device 100 transition the second communication device to an active mode of operation. In one or more embodiments, this transition of the second communication device from the OFF, low-power, or sleep mode to the active mode of operation occurs after the overhead information 109 is received using the first communication device and first communication network 105.

At step 102, the one or more processors of the electronic device 100 then cause the second communication device to establish a communication channel 103 on the second communication network 110 with the base station 104. In one or more embodiments, such as when the second communication network 110 comprises a 5G millimeter-wave network, the communication channel 103 comprises a millimeter-wave, beam-formed communication channel. The one or more processors of the electronic device 100 can then communicate 111 with the base station 104 on the second communication network 110 via the communication channel 103.

Thus, as shown in FIG. 1, the method utilizes two different communication devices operating on two different communication networks (the first communication network 105 and second communication network 110, which are different communication networks in FIG. 1) to establish a communication channel 103 with a base station 104. The electronic device 100 uses the first communication device operating on the first communication network 105 to transmit a parameter 107 of the electronic device to the base station 104, which principally communicates with electronic devices using a second communication network 110, one example of which is a wide area communication network such as a cellular network. The first communication device then receives overhead information 109 facilitating electronic communication 111 with the base station 104 operating in the second communication network 110.

The electronic device 100 then uses a second communication device (different from the first communication device) operating in the second communication network 110 (different from the first communication network) to establish the communication channel 103 with the base station 104. The electronic device 100 can then communicate 111 with the base station 104 on the second communication network 110.

When the first communication device is an ultra-wideband communication component, the second communication device can be a cellular communication component. As will be described below with reference to FIG. 3, the ultra-wideband communication component can include a transmitter and receiver or transceiver operable to communicate in an ultra-wideband communication network, while the cellular communication component can include a radio operable to communicate with one or more base stations of a terrestrial cellular network, examples of which include 5G networks, 2G networks, 3G networks, 4G networks, and so forth.

As shown in FIG. 1, in one or more embodiments the electronic device 100 uses the ultra-wideband component to obtain information from the base station 104 facilitating communication on the cellular network. Thereafter, the electronic device 100 can establish communication 111 on the cellular network using a cellular communication device and using the information obtained from the overhead information 109 received by the ultra-wideband component when communicating on the ultra-wideband network.

In the illustrative embodiment of FIG. 1, the base station 104 is equipped with another ultra-wideband transceiver capable of detecting ultra-wideband signals from the ultra-wideband transceiver of the electronic device 100. In one or more embodiments, both the base station 104 and the electronic device 100 turn OFF their cellular communication devices prior to step 102. Advantageously, this leaves the cellular communication devices in a low-power or sleep mode during this time, thereby conserving power.

In one or more embodiments, instead of continuously broadcasting beam sweeps as described above with reference to FIG. 11, the base station 104 and the electronic device 100 use the much lower power ultra-wideband network for initial communication, as shown at step 101. For instance, the base station 104 can use the lower power ultra-wideband network to broadcast its location to the electronic device 100 in the form of overhead information 109 transmitted on the first communication network 105. The electronic device 100 simply receives this information using its ultra-wideband transceiver. The electronic device 100 can then respond using the ultra-wideband network as well. As noted above, it may transmit a selected SS block for usage as the communication channel 103.

In one or more embodiments, once the base station 104 has determined the location of the electronic device 100 via the ultra-wideband network, both the base station 104 and the electronic device 100 will be able to select precisely which ODFM symbol should be used for synchronization. In one or more embodiments, this results from the fact that the base station 104 and electronic device 100 exchange three-dimensional location coordinates across the ultra-wideband network.

In one or more embodiments, the information exchanged in a handshaking process (shown at step 112 in FIG. 1) across the ultra-wideband network includes a secure transfer of three-dimensional positioning information so that the electronic device 100 can select and acquire a particular ODFM symbol identified from the overhead information 109. In one or more embodiments, the base station 104 additionally transfers the master information block (MIB) and any essential system information blocks (SIBs).

The method of FIG. 1 advantageously allows the electronic device 100 to expedite the acquisition procedure occurring at step 102 when turning ON its cellular radio due to the fact that it can directly tune to the optimal ODFM symbol selected from the overhead information 109 received from the base station 104 on the ultra-wideband network. This means that the electronic device 100 need not waste time, power, and resources, reading and analyzing signal sweeps prior to establishing the communication channel 103 with the base station 104. Additionally, both the base station 104 and electronic device 100 can wait until after step 101 to turn ON their cellular radios, i.e., they can wait until after preliminary information is exchanged using the ultra-wideband network. Each is able to tune their cellular radios quickly to "fast sync" to the best beam based upon location coordinates obtained using ultra-wideband communications.

Figure 2:
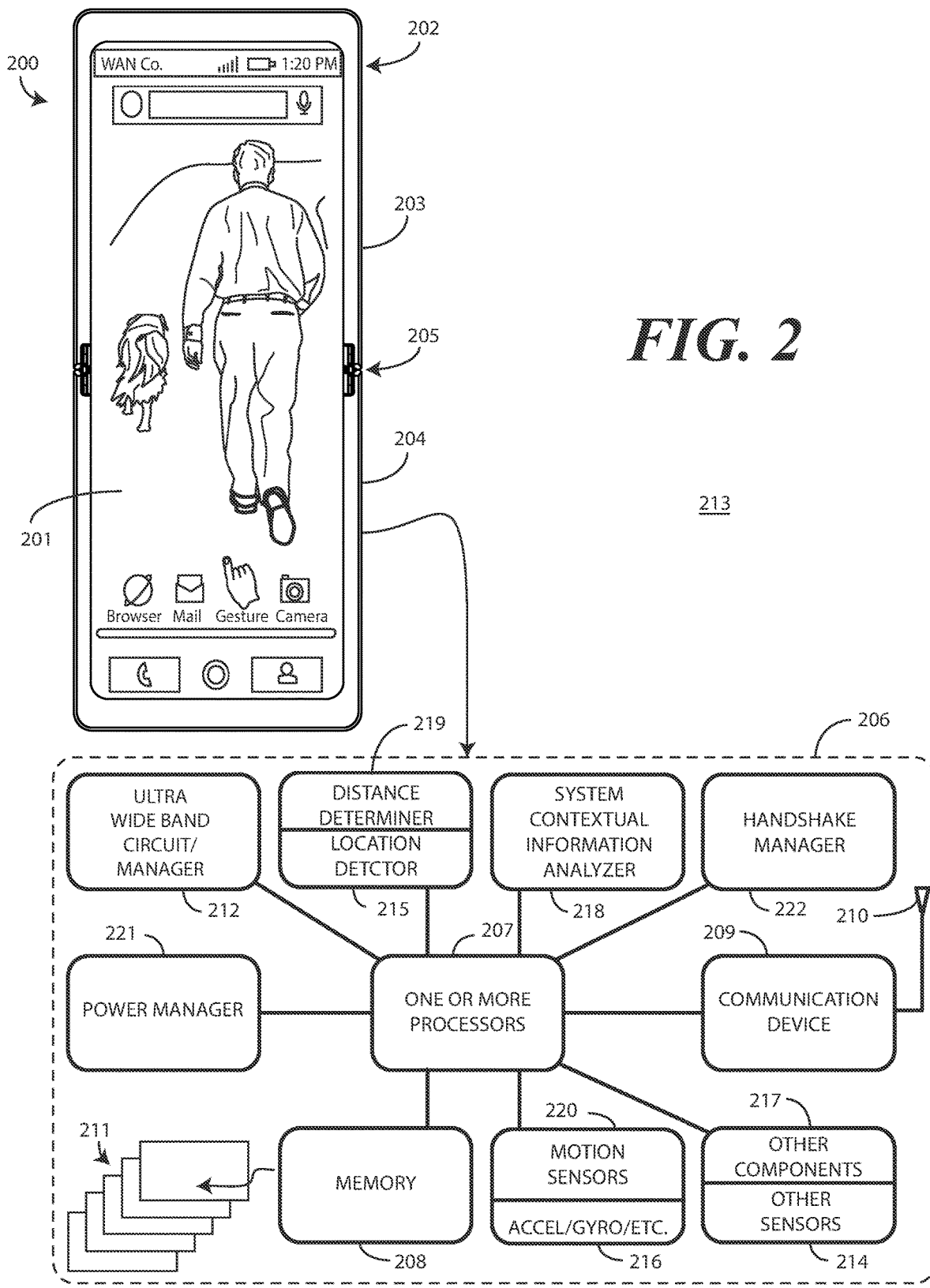
FIG. 2 illustrates one explanatory electronic device in accordance with one or more embodiments of the disclosure.

Turning now to FIG. 2, illustrated therein is one explanatory electronic device 200 configured in accordance with one or more embodiments of the disclosure. While the electronic device (100) of FIG. 1 was also configured in accordance with embodiments of the disclosure, it was a candy bar device while the electronic device 200 of FIG. 2 is a clamshell. Such differences indicate just how many different types of electronic devices can be configured to operate in accordance with the method described above with reference to FIG. 1, or alternatively to other methods described below with reference to subsequent figures.

The electronic device 200 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, or other device.

This illustrative electronic device 200 includes a display 201, which may optionally be touch-sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, such as that associated with the electronic device (100) of FIG. 1, the device housing 202 will be rigid and will include no hinge.

In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by electrical conductors or a bus disposed along one or more printed circuit boards.

The illustrative block diagram schematic 206 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one embodiment, the electronic device includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, such as a cellular network. In some embodiments, the communication device 209 can be configured to communicate with both wide area networks and other networks, such as a local area network, and/or personal area network. The communication device 209 may also utilize wireless technology for communication, such as, but are not limited to, peer-to-peer or ad hoc communications such as HomeRF, ultra-wideband, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an ultra-wideband component 212. In one or more embodiments, the ultra-wideband component is similar to the communication device 209 in that it is configured to perform wireless communications with one or more other ultra-wideband components that may be integrated into, or attached to, other devices. The illustrative ultra-wideband component of FIG. 2 is a dedicated ultra-wideband transceiver constructed into the electronic device 200 configured to use the one or more antennas 210 or its own antenna structure to communicate, using ultra-wideband technology, with another ultra-wideband component. In one or more embodiments, the ultra-wideband component comprises wireless communication circuitry, one of a receiver, a transmitter, or transceiver, and one or more antennas, which may be separate from, or the same as, the one or more antennas 210 used by the communication device 209. While the ultra-wideband component 212 is separated from the communication device 209 in the block diagram schematic 206 of FIG. 2, embodiments of the disclosure contemplate that they can be integrated together, as described above.

The inclusion of an ultra-wideband component 212 advantageously allows wireless communication with another ultra-wideband component connected to or integrated into another electronic device that is fast and secure, all while requiring very little power. In one or more embodiments, the ultra-wideband component 212 consumes at least an order of magnitude less energy than does the communication device 209. Ultra-wideband communication is especially well suited to embodiments of the disclosure because it is configured for short-range (within 250 meters) communication, which is satisfactory for applications such as the method of FIG. 1 described above.

Additionally, the accuracy of location, and therefore the accuracy of distance measurements, is within a centimeter or less. This is in contrast to Bluetooth.sup.™ which has an accuracy range of between one and five meters, and is far better than Wi-Fi, which has an accuracy of five to fifteen meters. Ultra-wideband is also quite reliable, in that it offers strong immunity to multi-path communication channels and interference in the line of sight. It also offers exceptional bandwidth, with data communications occurring at up to 27 Mbps, which is in contrast to the 2 Mbps provided by Bluetooth.sup.™. Ultra-wideband is also very low latency, with typically latencies being less than a millisecond, which is in contrast to the several seconds of latency that can occur with Bluetooth.sup.™.

In one or more embodiments, the ultra-wideband component 212 can also be used to measure angle of arrival. Effectively, when the one or more antennas 210 are configured as an antenna array, the ultra-wideband component 212 can compare signals received from one side of the antenna array with other signals received from another side of the antenna array to determine an orientation of the electronic device 200 in three-dimensional space 213 relative to a content presentation companion device having another ultra-wideband component attached thereto or integrated therein.

Various sensors 214 can be operable with the one or more processors 207. One example of a sensor that can be included with the various sensors 214 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 214 is a geo-locator that serves as a location detector 215. In one embodiment, location detector 215 is able to determine location data. Location can be determined by capturing the location data from a constellation of one or more earth orbiting satellites, or from a network of terrestrial base stations to determine an approximate location. The location detector 215 may also be able to determine location by locating or triangulating terrestrial base stations of a traditional cellular network, or from other local area networks, such as Wi-Fi networks.

Another example of a sensor that can be included with the various sensors 214 is an orientation detector 216 operable to determine an orientation and/or movement of the electronic device 200 in three-dimensional space 213. Illustrating by example, the orientation detector 216 can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector 216 can determine the spatial orientation of an electronic device 200 in three-dimensional space by, for example, detecting a gravitational direction. In addition to, or instead of, an accelerometer, an electronic compass can be included to detect the spatial orientation of the electronic device 200 relative to the earth's magnetic field. Similarly, one or more gyroscopes can be included to detect rotational orientation of the electronic device 200.

Other components 217 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 217 can also include proximity sensors. The proximity sensors fall in to one of two camps: active proximity sensors and "passive" proximity sensors. Either the proximity detector components or the proximity sensor components can be generally used for gesture control and other user interface protocols.

The other components 217 can optionally include a barometer operable to sense changes in air pressure due to elevation changes or differing pressures of the electronic device 200. The other components 217 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 218 can then be operable with the various sensors to detect, infer, capture, and otherwise determine persons and actions that are occurring in an environment about the electronic device 200. For example, where included one embodiment of the context engine 218 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 218 in detecting multi-modal social cues, emotional states, moods, and other contextual information. The context engine 218 can comprise an artificial neural network or other similar technology in one or more embodiments.

In one or more embodiments, the context engine 218 is operable with the one or more processors 207. In some embodiments, the one or more processors 207 can control the context engine 218. In other embodiments, the context engine 218 can operate independently, delivering information gleaned from detecting multi-modal social cues, emotional states, moods, and other contextual information to the one or more processors 207. The context engine 218 can receive data from the various sensors 214. In one or more embodiments, the one or more processors 207 are configured to perform the operations of the context engine 218.

In one or more embodiments, the electronic device 200 includes a distance determination manager 219 that is operable with the ultra-wideband component 212 to determine a precise distance (within one centimeter) of the electronic device 200 in relation to other electronic devices also having ultra-wideband components or ultra-wideband tags (the difference between a ultra-wideband component and a ultra-wideband tag is that the ultra-wideband component is integrated into an electronic device as an original component, while a ultra-wideband tag is a self-contained ultra-wideband component that can be attached to an electronic device as a retrofit item to configure a legacy electronic device to communicate via ultra-wideband technology). Illustrating by example, rather than using the location detector 215 to determine location relative to a base station, in one or more embodiments the distance determination manager 219 can determine the distance the electronic device 200 is from a base station equipped with a ultra-wideband tag within a centimeter using ultra-wideband signals.

A motion detector 220 determines when the electronic device 200 moves. As will be described in more detail below, in one or more embodiments the one or more processors 207 of the electronic device 200 dynamically adjust or restart the communication channel establishment process when movement of the electronic device 200 is determined to exceed a predefined threshold. While ultra-wideband communication is very conservative with respect to power consumption, embodiments of the disclosure contemplate that the electronic device 200 can be even more efficient when adjustments such as determining on which ODFM symbol to communicate with a base station only occur when the distance between the electronic device 200 and a selected base station has changed. Accordingly, changes in communication channel, selection of OFDM signal, or SS blocks occur only in response to one or both of the distance determination manager 219 detecting a change in the distance between the electronic device 200 and the base station with which it is communicating and/or the motion detector 220 determining that the electronic device 200 has moved relative to the base station after a communication channel has been established. To that end, a power manager 221 can be configured to ensure that distance measurements, ultra-wideband communications, user interface enhancements, and other operations are only performed once the electronic device 100 has moved since the last similar operation was performed. The power manager 221 can also place the communication device 209 in an OFF, low-power, or sleep mode when handshaking is occurring using the ultra-wideband component 212 as noted above.

A handshake manager 222 is operable to perform handshaking operations using the ultra-wideband component 212. These handshaking operations can include transmission of one or more parameters of the electronic device to a base station, receiving overhead information facilitating electronic communication with the base station using the communication device 209, and so forth.

The handshake manager 222 can uses the ultra-wideband component 212 to obtain information from a base station facilitating communication through the communication device 209 on a cellular network. For instance, the handshake manager 222 can use the ultra-wideband component 212 to broadcast a location of the electronic device 200 to the base station. In addition to location, the handshake manager 222 can use the ultra-wideband component 212 to transmit other parameters that may be necessary for communication such as a device identifier or identification number. In one or more embodiments, the information exchanged in a handshaking process using the ultra-wideband component 212 includes a secure transfer of three-dimensional positioning information so that the electronic device 200 can acquire a particular ODFM symbol. In one or more embodiments, the base station additionally transfers the master information block (MIB) and any essential system information blocks (SIBs) to the handshake manager 222 via the ultra-wideband component 212. In one or more embodiments, the ultra-wideband component 212 can also perform an ultra-wideband angle of arrival measurement to determine an orientation of the electronic device 200 in three-dimensional space relative to a base station.

Figure 3:
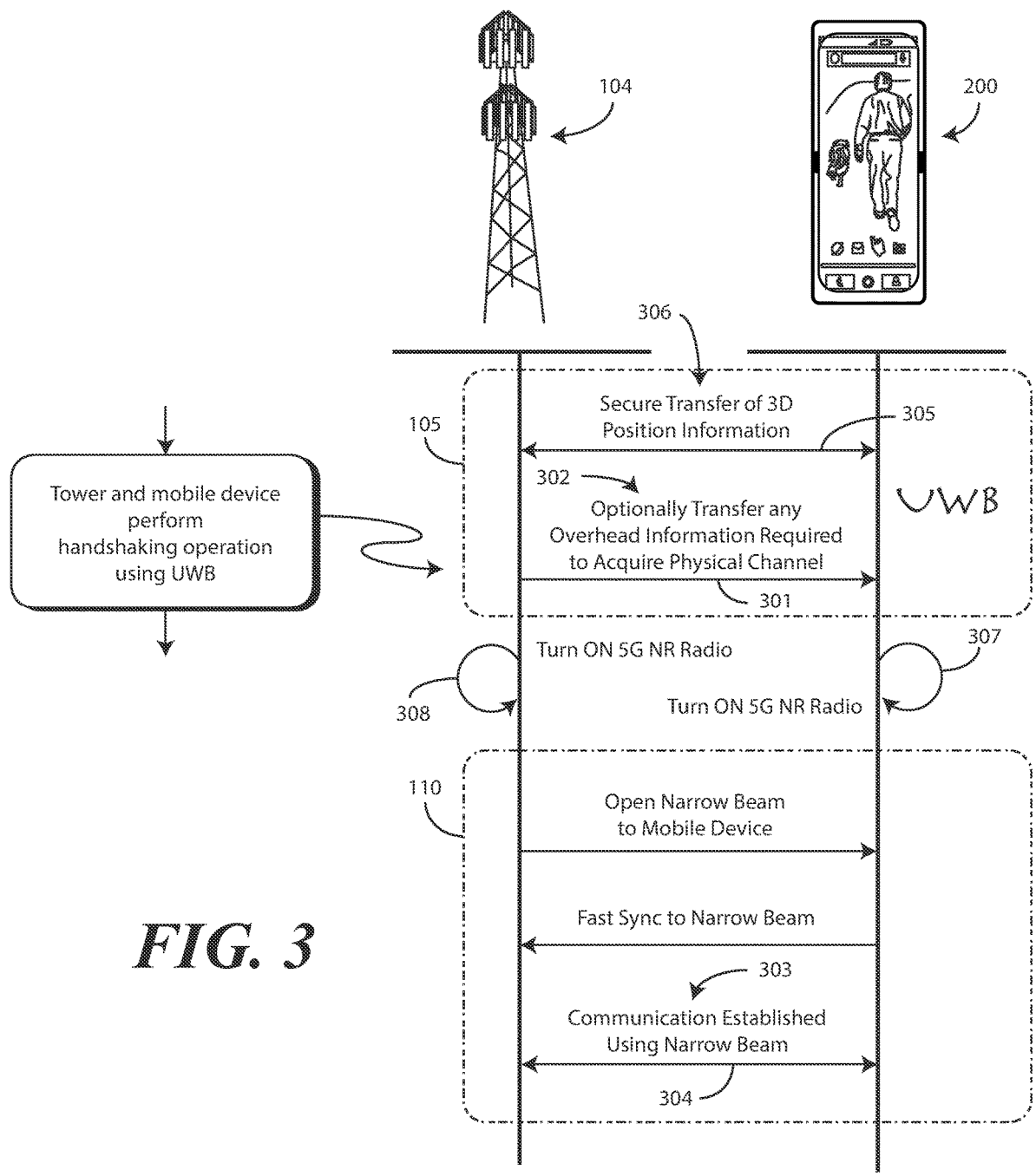
FIG. 3 illustrates one explanatory process diagram associated with one explanatory system configured in accordance with one or more embodiments of the disclosure.

Turning now to FIG. 3, illustrated therein is one explanatory signal flow diagram utilizing the electronic device 200 of FIG. 2 and the base station 104 of FIG. 1. As described above with reference to FIG. 2, the electronic device 100 includes a first communication device, one example of which is the ultra-wideband component (212), operating on a first communication network 105, and a second communication device, one example of which is the communication device (209), operating on at least a second communication network 110 that is different from the first communication network 105. In this illustrative embodiment, the first communication network 105 is a ultra-wideband network, while the second communication network 110 is a 5G cellular network.

The electronic device 200 also includes one or more processors (207) operable with the first communication device and the second communication device. As shown in FIG. 3, the one or more processors (207) use the first communication device to obtain 301 information 302 facilitating communication 303 with the base station 104 on the second communication network 110. Thereafter, the one or more processors (207) of the electronic device 200 establish communication 303 with the base station on a communication channel 304 of the second communication network 110 from the information 302 using the second communication device.

In this illustrative embodiment, the second communication network 110 supports millimeter wave communication. Accordingly, the communication channel 304 comprises a millimeter wave, beam-formed communication channel. In one or more embodiments, the communication channel 304 is selected from a plurality of communication channels available in the second communication network 110 as a function of the location of the electronic device 200 transmitted in the information 306 from the first communication device on the first communication network 105.

As noted above, embodiments are not so limited. While embodiments of the disclosure are particularly well suited for 5G networks using millimeter wave communications, they can equally be applied to other cellular networks that do not support millimeter wave beamforming, or that have wide beams or omnidirectional radiation patterns. Examples of such networks include 2G networks, 3G networks, 4G networks, and even 5G sub-6 MHz networks.

In the illustrative embodiment of FIG. 3, the one or more processors (207) of the electronic device 200 obtain 301 the information 302 facilitating communication with the base station 104 using the first communication device while the second communication device is in a low power mode of operation. The same is true of the base station 104, which receives 305 location information 306 of the electronic device 200 while its cellular radio is in a low power mode of operation. Advantageously, this results in the electronic device 200 and base station 104 consuming less power when communicating using the first communication network 105 than when communicating using the second communication network 110. In one or more embodiments, after exchanging this information 302,306, the base station 104 and or electronic device 200 then actuate 307,308 their second communication devices by transitioning them from the low-power mode of operation to an active mode of operation so that the communication channel 304 can be established.

Figure 4:
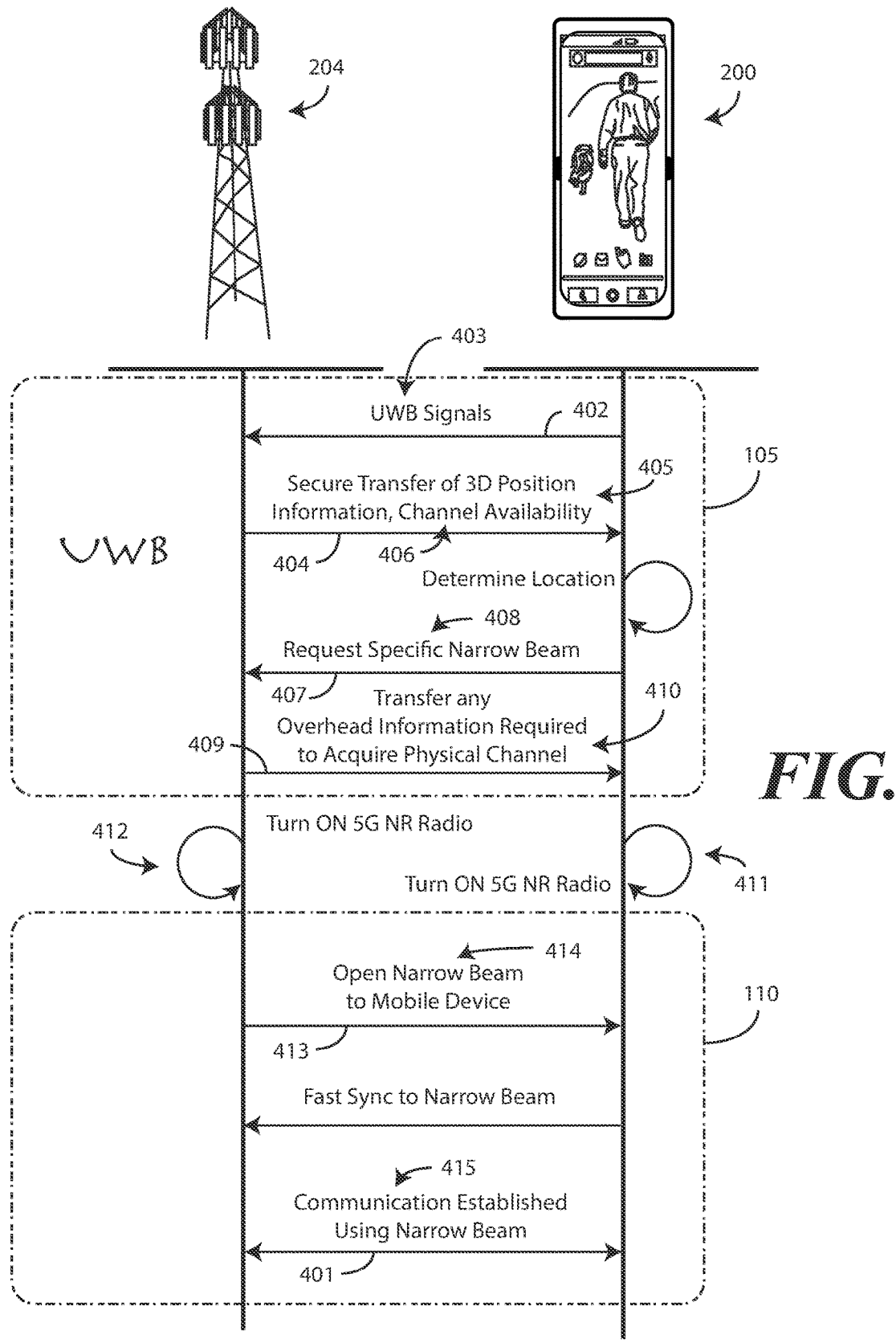
FIG. 4 illustrates another explanatory process diagram associated with one explanatory system configured in accordance with one or more embodiments of the disclosure.

Turning now to FIG. 4, illustrated therein is another explanatory signal flow diagram utilizing the electronic device 200 of FIG. 2 and the base station 104 of FIG. 1.

Turning now to FIG. 4, illustrated therein is another signal flow diagram illustrating how an electronic device 200 can establish a communication channel 401 in accordance with one or more embodiments of the disclosure. In one or more embodiments, the base station 104 detects 402, using a first communication device operating on a first communication network 105, first communication network signals 403 from an electronic device 200 operating within a predefined distance of the base station 104. In one or more embodiments, the predefined distance is about two hundred and fifty meters.

In one or more embodiments, in response to detecting 402 these first communication network signals 403, the base station 104 uses the first communication device to transmit 404 one or both of a location 405 of the base station 104 to the electronic device 200 and/or a plurality of communication channels 406 operating in a second communication network 110 that is different from the first communication network. In one or more embodiments, the first communication network 105 comprises a ultra-wideband network, while the second communication network 110 comprises a cellular network.

Once one or more processors (207) of the electronic device 200 select a communication channel 401 from the plurality of communication channels 406, the base station 104 receives 407, again with the first communication device across the first communication network 105, a response communication 408 from the electronic device 200. In one or more embodiments, the response communication 408 identifies the selected communication channel 401 to the base station 104. Thereafter, the base station 104 can transmit 409, using the first communication device and the first communication network 105, overhead information 410 facilitating electronic communication with the base station 104 on the communication channel 401 of the second communication network 110.

In one or more embodiments, the steps occurring in FIG. 4 to this point occur while communication devices in one or both of the base station 104 and/or the electronic device 200 that operate on the second communication network 110 are in a low power mode of operation. Accordingly, the cellular radios in both the base station 104 and the electronic device 200 may be OFF, in a low-power mode, or in a sleep mode to conserve power. In one or more embodiments, after exchanging the information described to this point, the base station 104 and or electronic device 200 then actuate 411, 412 their second communication devices by transitioning them from the low-power mode of operation to an active mode of operation so that the communication channel 401 can be established. In other embodiments, the second communication devices can be on while the first communication devices are exchanging information on the first communication network 105. The base station 104 is more likely to leave its second communication device on when the first communication device is exchanging information with the electronic device 200 due to the fact that it has a grid-based power source. The electronic device 200, being a portable electronic device in this example, runs from a battery and will likely turn the second communication device, e.g., the communication device (209) of FIG. 2, OFF when communicating with the base station 104 using the first communication device, e.g., the ultra-wideband component (212) of FIG. 2.

Once the second communication device of the base station 104 and the second communication device of the electronic device 200 are transitioned to their active modes of operation, in one or more embodiments the base station 104 provides 413 the electronic device 200 with a ODFM symbol 414 using the second communication device on the second communication network 110. In one or more embodiments, the ODFM symbol 414 is that which was requested by the electronic device 200 when communicating with the base station 104 using the first communication network 105. As noted above, the electronic device 200 can advantageously expedite the acquisition procedure after turning ON its second communication device due to the fact that it can directly tune to its requested, and most optimal, ODFM symbol 414 from the information received from the base station 104 on the first communication network 105. This means that the electronic device 200 need not waste time, power, and resources, reading and analyzing signal sweeps prior to establishing the communication channel 401 with the base station 104. Additionally, as shown in FIG. 4, both the base station 104 and electronic device 200 can wait to turn ON their cellular radios after preliminary information is exchanged using the ultra-wideband network. Each can then quickly tune their cellular radios "fast sync" to the best beam, requested by the electronic device 200, based upon location coordinates obtained using ultra-wideband communications. The electronic device 200 and base station 104 can then begin communicating 415 on the communication channel 401 using the second communication device and the second communication network 110.

In the embodiment of FIG. 4, the base station 104 initially detects the electronic device 200 operating within a predefined distance of the base station 104 and transmits information about itself to the electronic device 200, including available ODFM symbols, thereby allowing the electronic device 200 to choose the best ODFM symbol and request the same from the base station 104. Embodiments of the disclosure contemplate that the process can occur the other way around, with the base station 104 selecting the best ODFM symbol for the electronic device 200 based upon its location or other factors. Thereafter, the base station 104 can inform the electronic device 200 which ODFM symbol it should use. A signal flow diagram illustrating how this can occur is shown in FIG. 5.

Figure 5:
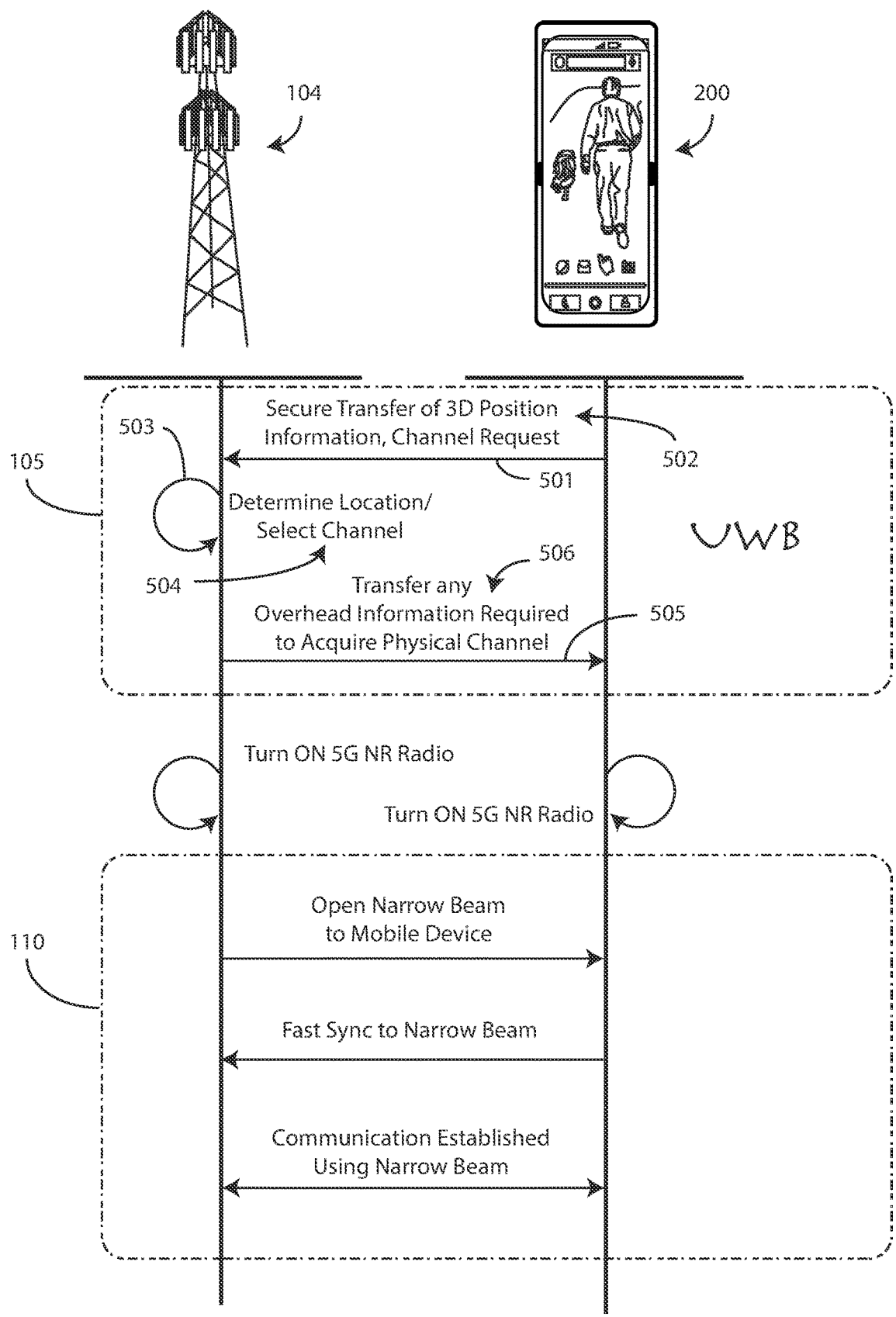
FIG. 5 illustrates still another process diagram associated with one explanatory system configured in accordance with one or more embodiments of the disclosure.

Turning now to FIG. 5, the electronic device 200 detects 402, using a first communication device operating on a first communication network 105, a base station 104 operating within a predefined distance of the electronic device 200. In one or more embodiments, the predefined distance is about two hundred and fifty meters.

In one or more embodiments, in response to detecting the base station 104, the electronic device 200 uses the first communication device to transmit 501 one or more parameters 502 about the electronic device 200 to the base station 104 on the first communication network 105. These parameters 502 can include a location of the electronic device 200, a device identifier of the electronic device 200, or other information required by the base station 104 to begin communication with the electronic device 200 on a communication channel of a second communication network 110.

In one or more embodiments, control components in the base station 104, or alternatively a computer or server complex in communication with the base station 104, selects 503 a communication channel 504 from a plurality of communication channels available from the base station 104 for communication on the second communication network 110. The base station 104 then transmits 505, again with the first communication device across the first communication network 105, overhead information 506 facilitating electronic communication with the base station 104 on the communication channel 504 of the second communication network 110. In one or more embodiments, this overhead information 506 includes the selected ODFM symbol to which electronic device 200 should synchronize to establish communication with the base station 104 on the second communication network 110. The remainder of the signal flow diagram of FIG. 5 is similar to that shown in FIG. 4 and will not be reprised here in the interest of brevity. However, the description of those portions of FIG. 4 shown in FIG. 5 is incorporated into this portion of the disclosure by reference.

In one or more embodiments, if the electronic device 200 moves, a portion or all of the process can repeat. One example of how this can occur is shown in FIG. 6.

Figure 6:
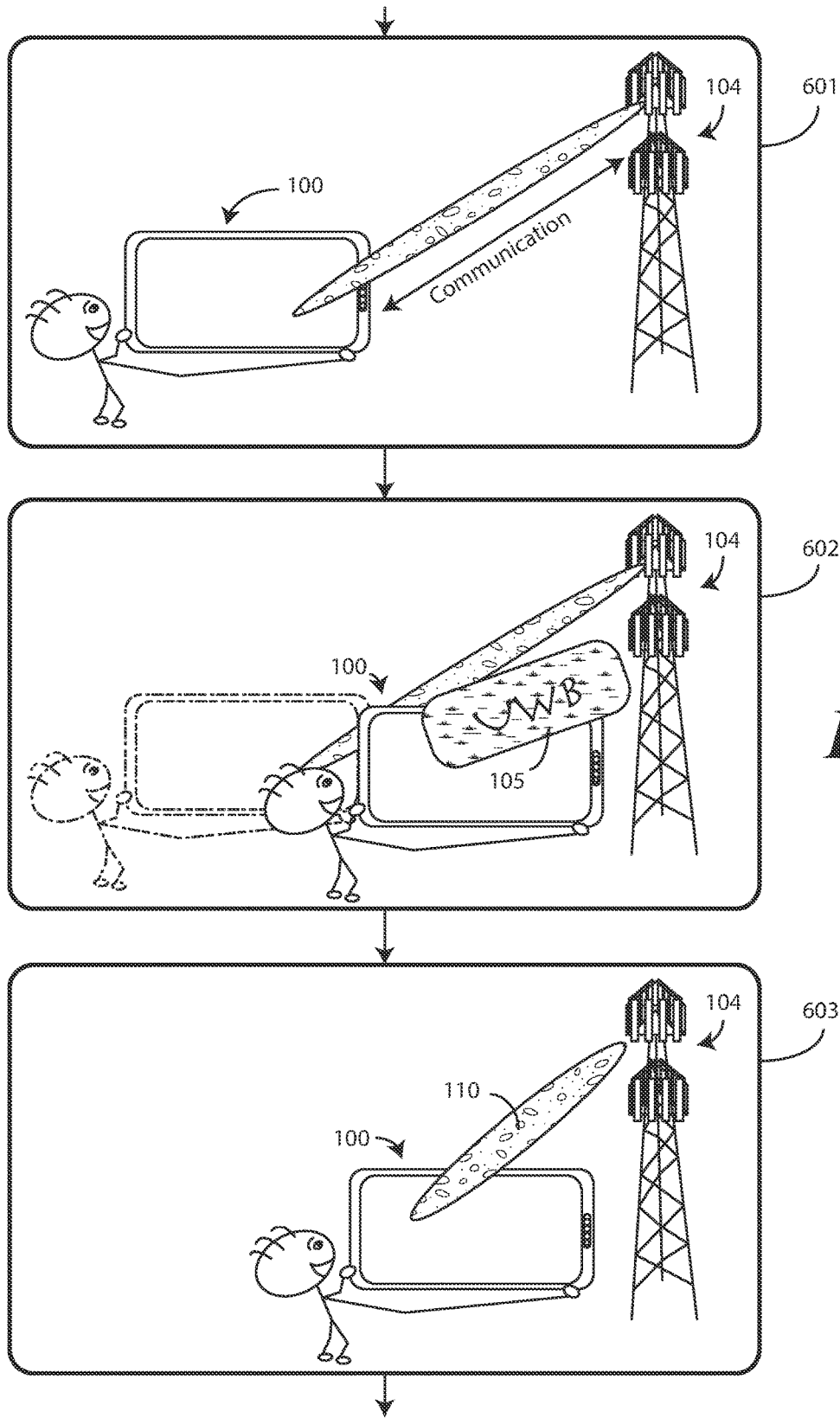
FIG. 6 illustrates another explanatory method in accordance with one or more embodiments of the disclosure.

Turning now to FIG. 6, an electronic device 100 is initially communicating with a base station 104 on a communication channel at step 601. However, at step 602 the electronic device 100 moves. For instance, the electronic device 100 may have moved out of range of the base station 104, thereafter beginning communication with another base station for, and then re-enters the environment of the base station 104 at step 602.

In one or more embodiments, one or more sensors (examples of which include a motion detector nd/or location detector) of the electronic device 100 can detect this movement of the electronic device 100 relative to the base station 104. Accordingly, in response to detecting the movement of the electronic device 100, at step 602 the one or more processors (207) of the electronic device 100 can cause the first communication device to repeat some or all of the upper portion of the signal flow diagrams shown in any of FIG. 3, 4, or 5. Illustrating by example, in response to detecting the movement of the electronic device 100 relative to the base station 104, the one or more processors (207) may cause the first communication device to transmit another location of the electronic device 100 to the base station 104 using the first communication network 105, and so forth. The electronic device 100 can then again begin communicating with the base station 104 using the second communication network 110 as previously described and as shown at step 603.

Figure 7:
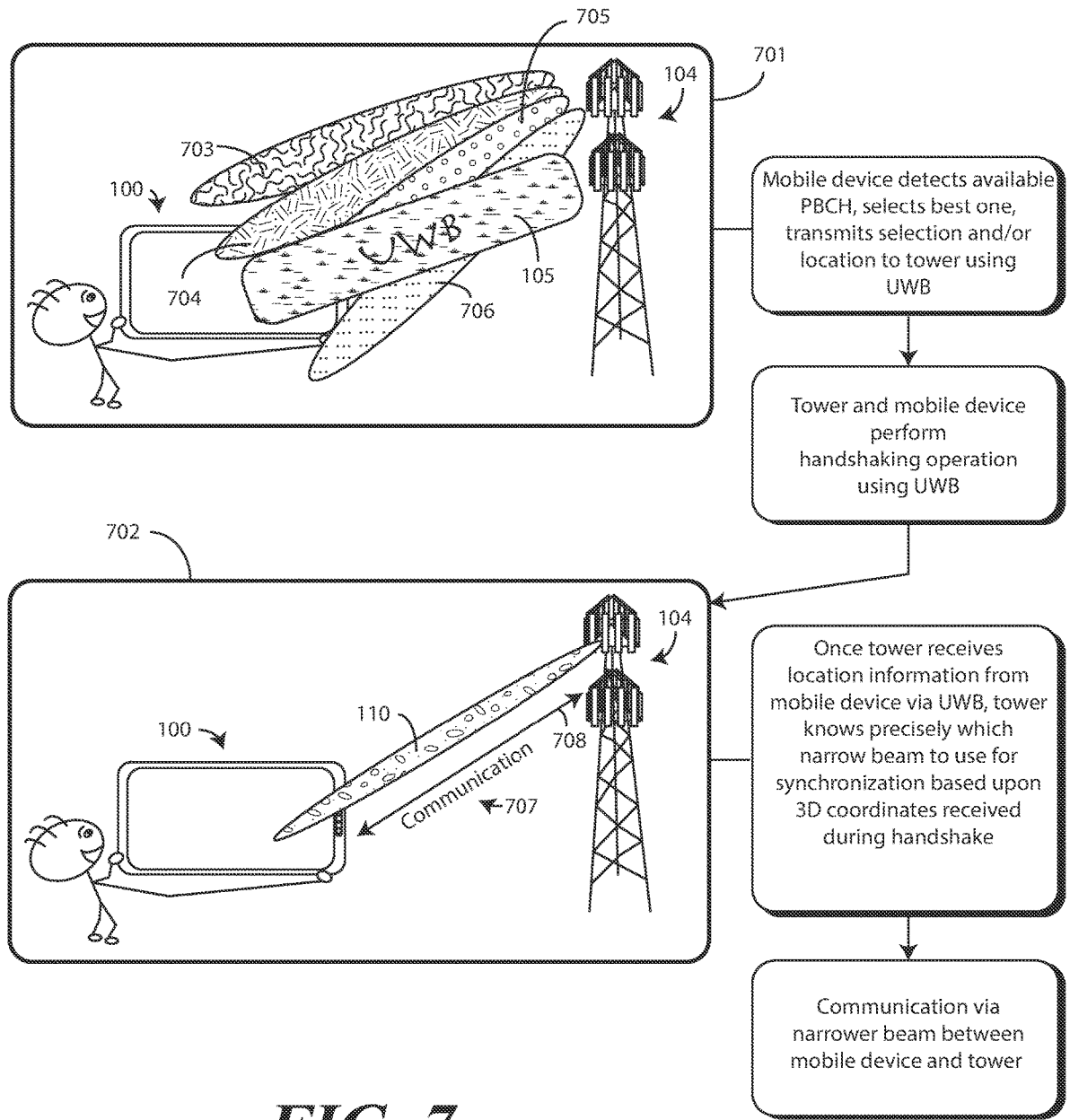
FIG. 7 illustrates another explanatory method in accordance with one or more embodiments of the disclosure.

Embodiments of the disclosure also contemplate other alternate techniques of establishing a communication channel on a second communication network, using a first communication network initially, as well. Turning now to FIG. 7, illustrated therein is one such example.

At step 701, a base station 104 performs a beam sweeping operation. During the beam sweeping operation, the base station transmits the physical broadcast channel (PBCH) in groups of four orthogonal frequency-division multiplexing (ODFM) symbols 703,704,705,706. These four ODFM symbols 703,704,705,706 are swept sequentially in multiple directions as shown at step 701. Each of the ODFM symbols 703,704,705,706 is mapped to a different spatial direction at step 1101.

At step 701, an electronic device 100 selects the strongest detected ODFM symbol 705 as the best SS block to use. The electronic device 100 then uses a first communication device, operating on a first communication network 105, to inform the base station 104 that it will synchronize to this optimal SS block.

At step 702, the base station 104 provides the electronic device 100 with the ODFM symbol representing the requested SS block using the second communication device on the second communication network 110. The electronic device 100 can then quickly tune its cellular radios to the ODFM symbol to "fast sync" to this requested SS block. The electronic device 100 and base station 104 can then begin communicating 707 on the communication channel 708 using the second communication device and the second communication network 110.

As noted above, one advantage offered by embodiments of the disclosure is that if, for any reason, a suitable handshake cannot be performed using the ultra-wideband network, a system configured in accordance with embodiments of the disclosure can simply fall back on the prior art acquisition method described above with reference to FIG. 11 until the system is rectified. One illustrative method for doing this is shown in FIG. 8.

Figure 8:
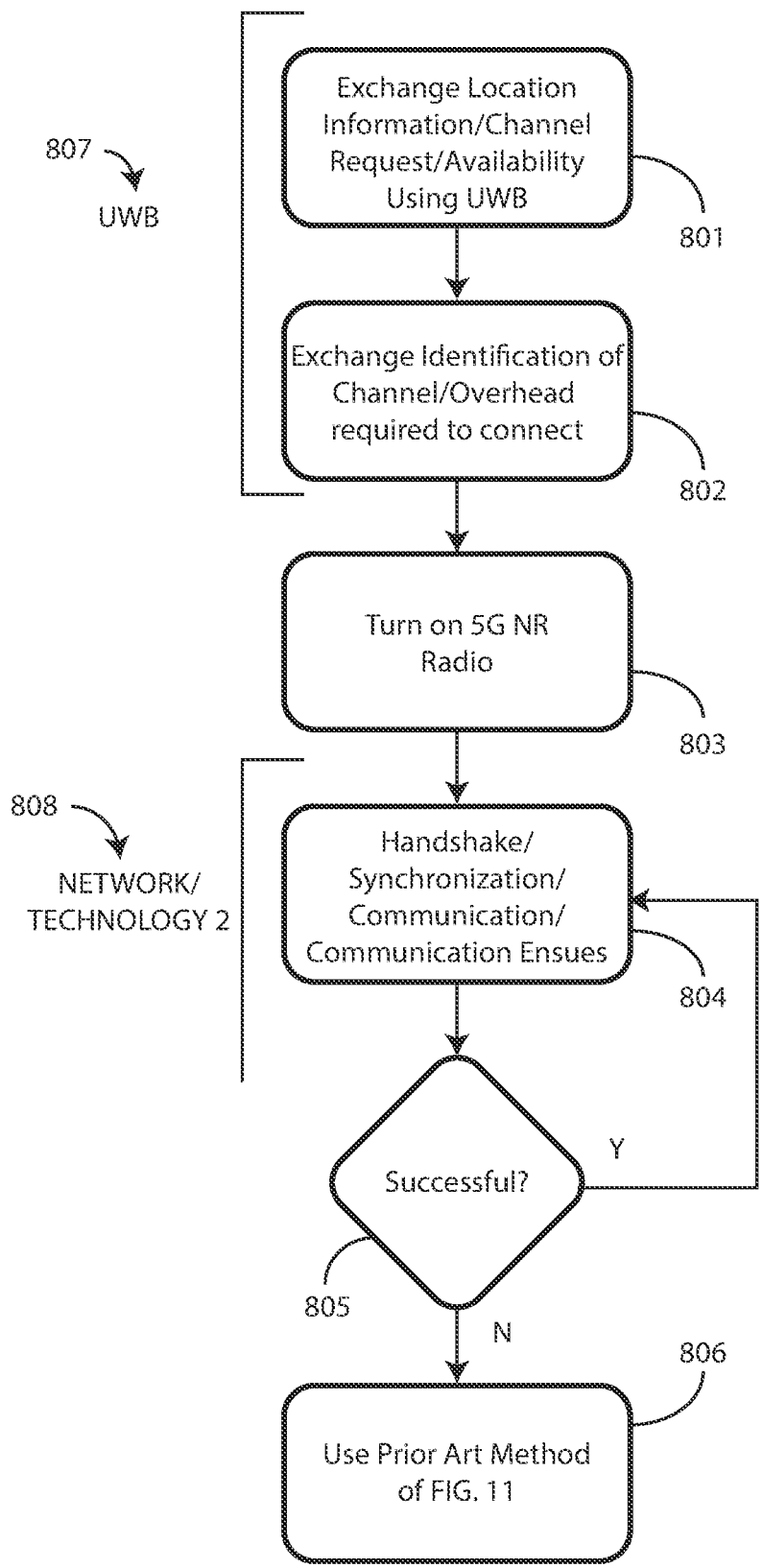
FIG. 8 illustrates another explanatory method in accordance with one or more embodiments of the disclosure.

Turning now to FIG. 8, at step 801 a base station and an electronic device use an ultra-wideband network 807 for initial communication. At step 801, this includes the electronic device and the base station performing a hand shaking operation using the ultra-wideband network 807. For instance, the base station can use the ultra-wideband network 807 to broadcast its location to the electronic device in the handshaking operation. In addition to location, at step 802 other parameters that may be necessary for communication on a second communication network 808 that is different from the ultra-wideband network 807 can be exchanged too, one example of which is a device identifier or identification number. During steps 801 and 802, the electronic device simply receives this information using its ultra-wideband transceiver.

In one or more embodiments, once the base station has determined the location of the electronic device via the ultra-wideband network, both the base station and the electronic device will be able to select precisely which ODFM symbol should be used for synchronization. In one or more embodiments, this results from the fact that the base station and electronic device exchange three-dimensional location coordinates across the ultra-wideband network during the handshaking operation occurring at step 801.

In one or more embodiments, the information exchanged in a handshaking process occurring at step 801 across the ultra-wideband network includes a secure transfer of three-dimensional positioning information so that the electronic device can acquire a particular ODFM symbol. In one or more embodiments, the base station additionally transfers the MIB and any essential SIBs on the ultra-wideband network 807 as well.

At step 803, the electronic device and the base station each turn ON their respective cellular radios. At step 804, each tunes their cellular radios quickly to "fast sync" to the best beam based upon location coordinates obtained using ultra-wideband communications.

Advantageously, steps 801-804 offload portions of the channel establishment procedure for the second communication network 808 to the ultra-wideband network 807. This saves power by allowing the electronic device and base station to turn OFF their cellular radios while this occurs. Decision 805 determines whether establishment of the communication channel on the second communication network 808 was successful. If it was, communication ensues. However, if it was unsuccessful for any reason, step 806 allows the method to simply fall back on the prior art acquisition method described above with reference to FIG. 11 until any outstanding issues precluding the method from being successful at step 804 are rectified.

Figure 9:
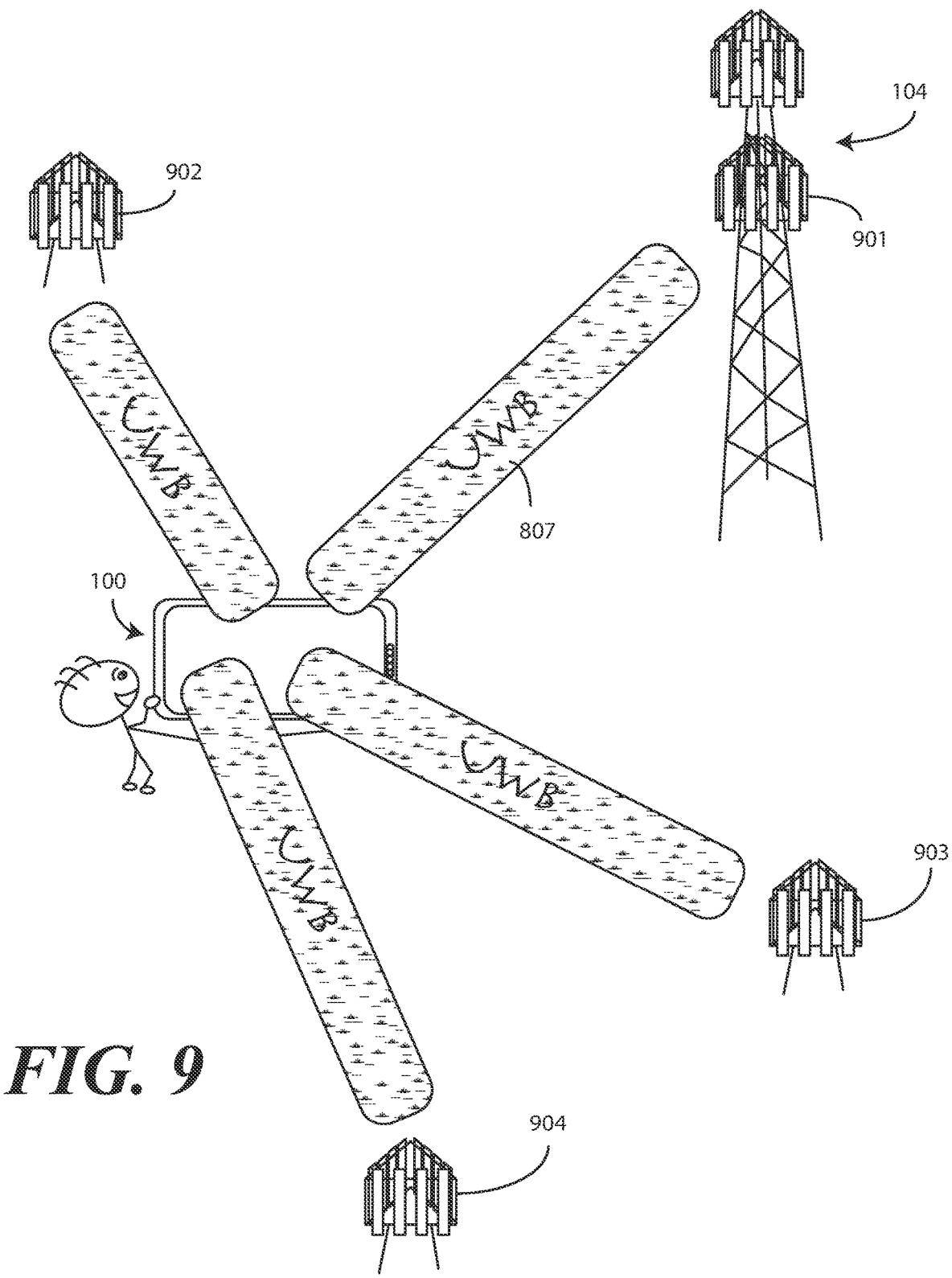
FIG. 9 illustrates one or more method steps in accordance with one or more embodiments of the disclosure.

Another advantage offered by embodiments of the disclosure is that the ultra-wideband network 807 may operate in parallel with the second communication network 808, thereby supporting it. For example, operating the two networks in parallel can offer enhanced precision for beam signal selections. Turning now to FIG. 9, illustrated therein is one such system offering such advantages.

As shown in FIG. 9, an electronic device 100 configured in accordance with one or more embodiments of the disclosure seeks to establish a communication channel on a cellular network with a base station 104. The base station 104 is operable with not one communication device configured to communicate across a ultra-wideband network 807, but a plurality of communication devices 901,902,903,904. Even when the electronic device 100 has established its communication channel on the cellular network, being able to communicate with the base station 104 using the ultra-wideband network 807 still has advantages. For instance, in the illustrative system of FIG. 9 three-dimensional orientation beam parameters obtained by the base station 104 from the plurality of communication devices 901,902,903,904 can be aggregated using the ultra-wideband network 807. From this aggregated information, the base station 104 may be able to offer improved signals on the cellular network for the electronic device 100 to use for communication with the base station 104, and so forth.

Figure 10:
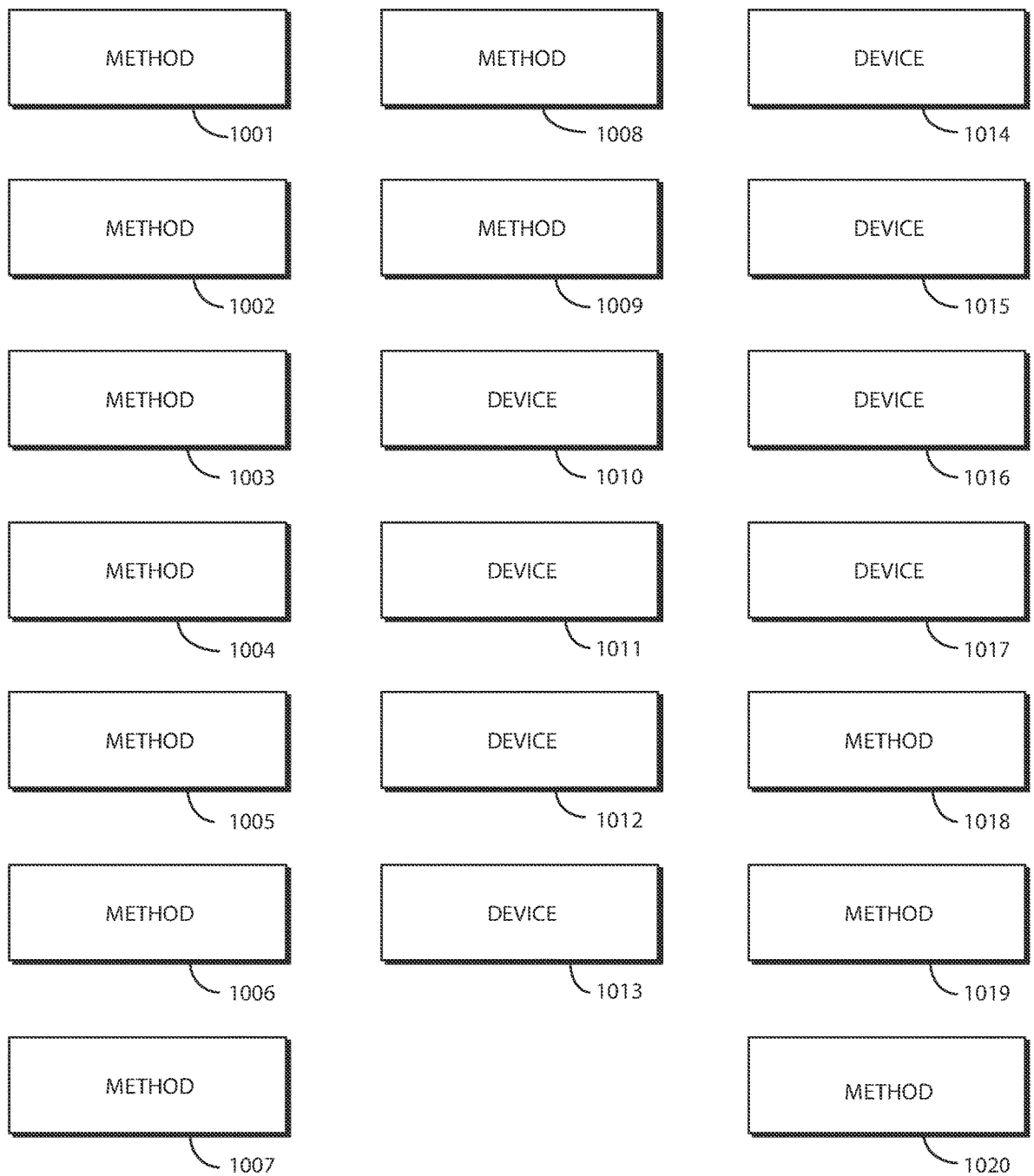
FIG. 10 illustrates various embodiments of the disclosure.

Turning now to FIG. 10, illustrated therein are various embodiments of the disclosure. The embodiments of FIG. 10 are shown as labeled boxes in FIG. 10 due to the fact that the individual components of these embodiments have been illustrated in detail in FIGS. 1-9, which precede FIG. 10. Accordingly, since these items have previously been illustrated and described, their repeated illustration is no longer essential for a proper understanding of these embodiments. Thus, the embodiments are shown as labeled boxes.

At 1001, a method in an electronic device comprises transmitting, with a first communication device using a first communication network, a parameter of the electronic device to a base station of a second communication network. At 1001, the method comprises receiving, with the first communication device using the first communication network, overhead information facilitating electronic communication with the base station using the second communication network.

At 1001, the method comprises establishing, with a second communication device using the second communication network, a communication channel with the base station. At 1001, the method comprises communicating, with the second communication device using the second communication network, with the base station via the communication channel. At 1001, the first communication network and the second communication network are different.

At 1002, the first communication network of 1001 comprises a local area network. At 1003, the second communication network of 1002 comprises a wide area network.

At 1004, the local area network of 1003 comprises an ultra-wideband network. At 1005, the wide area network of 1004 comprises a cellular network. At 1006, the communication channel of 1005 comprises a millimeter-wave, beam-formed communication channel.

At 1007, the method of 1003 further comprises selecting, with one or more processors, the communication channel from a plurality of communication channels operating in the second communication network. At 1007, the method comprises transmitting, with the first communication device using the first communication network, an identification of the communication channel to the base station.

At 1008, the parameter of 1003 comprises a location of the electronic device. At 1008, transmission of the location and receipt of the overhead information occurs while the second communication device is one of OFF, in a low-power mode, or in a sleep mode. At 1009, the method of 1008 further comprises transitioning the second communication device to an active mode of operation after receiving the overhead information with the first communication device using the first communication network.

At 1010, the method of 1003 further comprises detecting, with one or more sensors of the electronic device, movement of the electronic device relative to the base station. At 1010, in response to detecting the movement of the electronic device, the method comprises transmitting, with the first communication device using the first communication network, another location of the electronic device to the base station.

At 1011, an electronic device comprises a first communication device operable for communication using a first communication network. At 1011, the electronic device comprises a second communication device operable for communication using a second communication network that is different from the first communication network.

At 1011, the electronic device comprises one or more processors operable with the first communication device and the second communication device. At 1011, the one or more processors obtain information facilitating communication with a base station of a wide area network using the first communication device and, thereafter, establish communication with the base station on a communication channel of the second communication network from the information using the second communication device.

At 1012, the first communication network of 1011 comprises an ultra-wideband network and the second communication network comprising a cellular network. At 1013, the cellular network of 1012 comprises a fifth generation (5G) cellular network. At 1014, the 5G cellular network of 1013 supports millimeter wave communication, with the communication channel comprising a millimeter wave, beam-formed communication channel.

At 1015, the one or more processors of 1014 obtain the information facilitating communication with the base station using the first communication device while the second communication device is in a low power mode of operation. At 1016, the one or more processors of 1014 further transmit, with the first communication device using the first communication network, a location of the electronic device to the base station. At 1016, the communication channel is selected from a plurality of communication channels available in the second communication network as a function of the location. At 1017, the first communication device of 1011 consumes less power when communicating using the first communication network than does the second communication device when communicating using the second communication network.

At 1018, a method in a base station of a wide area communication network comprises detecting, with a first communication device using a first communication network, signals from an electronic device using the first communication network. At 1018, the method comprises transmitting, with the first communication device using the first communication network, one or both of a location of the base station to the electronic device and/or a plurality of communication channels operating in a second communication network that is different from the first communication network.

At 1018, the method comprises receiving, with the first communication device using the first communication network, a response communication from the electronic device. At 1018, the method comprises transmitting, with the first communication device using the first communication network, overhead information facilitating electronic communication with the base station on a communication channel using the second communication network to the electronic device.

At 1018, the method comprises providing, with a second communication device using the second communication network, the communication channel to the electronic device. At 1018, the method comprises communicating, with the second communication device using the second communication network, with the electronic device on via communication channel.

At 1019, the method of 1018 further comprises receiving the response communication from the electronic device with at least a third communication device using the first communication network. At 1019, the method comprises aggregating response communications from the electronic device received by the first communication device and the at least a third communication device to obtain an aggregate response communication. At 1019, the method comprises selecting the communication channel from a plurality of available communication channels operating in the second communication network using a location of the electronic device obtained from the aggregate response communication.

At 1020, the first communication network of 1018 comprises an ultra-wideband network. At 1020, the communication channel comprises a millimeter wave, beam-formed communication channel of a fifth generation (5G) cellular network.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method in an electronic device, the method comprising:

transmitting, with a first communication device using a first communication network, a parameter of the electronic device to a base station of a second communication network;

receiving, with the first communication device using the first communication network, overhead information facilitating electronic communication with the base station using the second communication network;
establishing, with a second communication device using the second communication network, a communication channel with the base station; and
communicating, with the second communication device using the second communication network, with the base station via the communication channel;
wherein the first communication network and the second communication network are different;
the first communication network comprising a local area network;
the second communication network comprising a wide area network;
the local area network comprising an ultra-wideband network; and
the method further comprising:
selecting, with one or more processors, the communication channel from a plurality of communication channels operating in the second communication network; and
transmitting, with the first communication device using the first communication network, an identification of the communication channel to the base station.

2. The method of claim 1, the wide area network comprising a fifth generation (5G) cellular network.

3. The method of claim 2, the 5G cellular network supporting millimeter wave communication, the communication channel comprising a millimeter wave, beam-formed communication channel.

4. The method of claim 1, wherein the parameter comprises a location of the electronic device.

5. The method of claim 1, the wide area network comprising a cellular network.

6. The method of claim 5, the communication channel comprising a millimeter-wave, beam-formed communication channel.

7. The method of claim 1, wherein the overhead information comprises a location of the base station.

8. The method of claim 1, wherein the parameter comprises a location of the electronic device, further wherein transmission of the location and receipt of the overhead information occurs while the second communication device is one of OFF, in a low-power mode, or in a sleep mode.

9. The method of claim 8, further comprising transitioning the second communication device to an active mode of operation after receiving the overhead information with the first communication device using the first communication network.

10. The method of claim 1, further comprising:
detecting, with one or more sensors of the electronic device, movement of the electronic device relative to the base station; and
in response to detecting the movement of the electronic device, transmitting, with the first communication device using the first communication network, another location of the electronic device to the base station.

11. A method in a base station of a wide area communication network, the method comprising:
detecting, with a first communication device using a first communication network, signals from an electronic device using the first communication network;
transmitting, with the first communication device using the first communication network, one or both of:
a location of the base station to the electronic device; and/or
a plurality of communication channels operating in a second communication network that is different from the first communication network;
receiving, with the first communication device using the first communication network, a response communication from the electronic device;
transmitting, with the first communication device using the first communication network, overhead information facilitating electronic communication with the base station on a communication channel using the second communication network to the electronic device;
providing, with a second communication device using the second communication network, the communication channel to the electronic device; and
communicating, with the second communication device using the second communication network, with the electronic device via the communication channel.

12. The method of claim 11, further comprising:
receiving the response communication from the electronic device with at least a third communication device using the first communication network;
aggregating response communications from the electronic device received by the first communication device and the at least a third communication device to obtain an aggregate response communication; and
selecting the communication channel from a plurality of available communication channels operating in the second communication network using a location of the electronic device obtained from the aggregate response communication.

13. The method of claim 11, wherein the first communication network comprises an ultra-wideband network and the communication channel comprises a millimeter wave, beam-formed communication channel of a fifth generation (5G) cellular network.

14. A method in an electronic device, the method comprising:
transmitting, with a first communication device using a first communication network, a parameter of the electronic device to a base station of a second communication network;
receiving, with the first communication device using the first communication network, overhead information facilitating electronic communication with the base station using the second communication network;
establishing, with a second communication device using the second communication network, a communication channel with the base station; and
communicating, with the second communication device using the second communication network, with the base station via the communication channel;
wherein the first communication network and the second communication network are different;
the first communication network comprising a local area network;
the second communication network comprising a wide area network;
the local area network comprising an ultra-wideband network; and
the method further comprising:
detecting, with one or more sensors of the electronic device, movement of the electronic device relative to the base station; and
in response to detecting the movement of the electronic device, transmitting, with the first communication device using the first communication network, another location of the electronic device to the base station.

15. The method of claim 14, the wide area network comprising a cellular network.

16. The method of claim 15, the cellular network comprising a fifth generation (5G) cellular network.

17. The method of claim 15, the communication channel comprising a millimeter-wave, beam-formed communication channel.

18. The method of claim 14, wherein the parameter comprises a location of the electronic device, further wherein transmission of the location and receipt of the overhead information occurs while the second communication device is one of OFF, in a low-power mode, or in a sleep mode.

19. The method of claim 18, further comprising transitioning the second communication device to an active mode of operation after receiving the overhead information with the first communication device using the first communication network.

20. The method of claim 14, wherein the first communication device consumes less power when communicating using the first communication network than does the second communication device when communicating using the second communication network.

\* \* \* \* \*